(12) United States Patent  
Maurer

(10) Patent No.: US 9,218,465 B2  
(45) Date of Patent: Dec. 22, 2015

(54) DIGITAL MEDIA CONTENT CREATION AND DISTRIBUTION METHODS

(76) Inventor: Jill Lewis Maurer, Raleigh, NC (US)

( * ) Notice: Subject to any disclaimer, the term of this patent is extended or adjusted under 35 U.S.C. 154(b) by 1181 days.

(21) Appl. No.: 12/075,186

(22) Filed: Mar. 10, 2008

(65) Prior Publication Data

US 2009/0228989 A1    Sep. 10, 2009

(51) Int. Cl.
*H04N 7/16* (2011.01)
*G06F 17/00* (2006.01)
*G06F 21/10* (2013.01)

(52) U.S. Cl.
CPC ........ *G06F 21/10* (2013.01); *G06F 2221/2119* (2013.01)

(58) Field of Classification Search
CPC ... G06F 21/10; G06F 17/60; G11B 20/00137; G11B 20/00746; G11B 20/00797; G11B 20/00804
USPC ......................... 726/28, 26, 1; 725/25.27, 120
See application file for complete search history.

(56) References Cited

U.S. PATENT DOCUMENTS

| | | | |
|---|---|---|---|
| 6,178,424 B1 | 1/2001 | Okumura et al. | |
| 6,453,305 B1 * | 9/2002 | Glassman et al. | 705/59 |
| 6,549,942 B1 | 4/2003 | Janky et al. | |
| 6,760,918 B2 | 7/2004 | Rodriguez et al. | |
| 6,801,576 B1 | 10/2004 | Haldeman et al. | |
| 6,968,384 B1 | 11/2005 | Redding et al. | |
| 6,983,371 B1 | 1/2006 | Hurtado et al. | |
| 7,047,241 B1 | 5/2006 | Erickson | |
| 7,069,310 B1 | 6/2006 | Bartholomew | |
| 7,177,841 B2 | 2/2007 | Inoue et al. | |
| 7,257,716 B2 | 8/2007 | Gaya | |
| 7,263,497 B1 | 8/2007 | Wiser et al. | |
| 7,308,422 B1 | 12/2007 | Faber et al. | |
| 7,450,954 B2 | 11/2008 | Randall | |
| 7,600,266 B2 * | 10/2009 | Thomas | 726/31 |
| 7,873,578 B2 | 1/2011 | Johnson et al. | |
| 8,234,302 B1 * | 7/2012 | Goodwin et al. | 707/783 |
| 2001/0034705 A1 | 10/2001 | Rhoads et al. | |
| 2001/0042048 A1 | 11/2001 | Boykin et al. | |
| 2001/0049728 A1 | 12/2001 | Kang | |
| 2002/0002541 A1 * | 1/2002 | Williams | 705/51 |
| 2002/0035723 A1 | 3/2002 | Inoue et al. | |
| 2002/0049717 A1 | 4/2002 | Routtenberg et al. | |
| 2002/0073166 A1 | 6/2002 | Lynch | |
| 2002/0112171 A1 | 8/2002 | Ginter et al. | |
| 2002/0147790 A1 | 10/2002 | Snow | |
| 2003/0028889 A1 * | 2/2003 | McCoskey et al. | 725/91 |
| 2003/0033247 A1 | 2/2003 | McCrossin et al. | |
| 2003/0037157 A1 * | 2/2003 | Pestoni et al. | 709/231 |
| 2003/0079133 A1 | 4/2003 | Breiter et al. | |
| 2003/0084461 A1 * | 5/2003 | Hoang | 725/145 |

(Continued)

OTHER PUBLICATIONS

"Optical Jukebox." Wikipedia.com, http://en.wikipedia.org/wiki/Optical_Jukebox. Retrieved on May 26, 2011, pp. 1-3.

(Continued)

*Primary Examiner* — Abu Sholeman
(74) *Attorney, Agent, or Firm* — Coats & Bennett, P.L.L.C.

(57) ABSTRACT

A system and methods for digital content creation and upload through a managed website for providing network-based access to authorized users who pay for predetermined rights that allow for use of the content by the authorized user on a multiplicity of devices, without having to repurchase access to the same content.

3 Claims, 2 Drawing Sheets

(56) References Cited

U.S. PATENT DOCUMENTS

| | | |
|---|---|---|
| 2003/0097655 A1 | 5/2003 | Novak |
| 2003/0101225 A1 | 5/2003 | Han et al. |
| 2003/0110084 A1 | 6/2003 | Eberhard et al. |
| 2003/0135464 A1 | 7/2003 | Mourad et al. |
| 2003/0158928 A1 | 8/2003 | Knox et al. |
| 2004/0019520 A1 | 1/2004 | Guglielmucci |
| 2004/0024688 A1 | 2/2004 | Bi et al. |
| 2004/0044779 A1 | 3/2004 | Lambert |
| 2004/0044899 A1 | 3/2004 | Gaya |
| 2004/0122700 A1 | 6/2004 | Aoki et al. |
| 2004/0148344 A1 | 7/2004 | Navar et al. |
| 2004/0215516 A1 | 10/2004 | Denoon et al. |
| 2004/0254883 A1 | 12/2004 | Kondrk et al. |
| 2004/0266336 A1* | 12/2004 | Patsiokas et al. ............ 455/3.04 |
| 2005/0005000 A1 | 1/2005 | Yoshimoto |
| 2005/0021478 A1 | 1/2005 | Gautier et al. |
| 2005/0044016 A1 | 2/2005 | Irwin et al. |
| 2005/0050345 A1 | 3/2005 | Dowdy et al. |
| 2005/0091164 A1* | 4/2005 | Varble ............................. 705/52 |
| 2005/0138357 A1* | 6/2005 | Swenson et al. ............. 713/155 |
| 2005/0203959 A1 | 9/2005 | Muller et al. |
| 2005/0240548 A1 | 10/2005 | Fujioka |
| 2006/0009895 A1* | 1/2006 | Oishi et al. ...................... 701/45 |
| 2006/0053232 A1 | 3/2006 | Onoda et al. |
| 2006/0098795 A1* | 5/2006 | Choti et al. .............. 379/114.14 |
| 2006/0120385 A1* | 6/2006 | Atchison et al. ............. 370/400 |
| 2006/0149681 A1 | 7/2006 | Meisner |
| 2006/0179127 A1 | 8/2006 | Randall |
| 2006/0206580 A1 | 9/2006 | Johnson, III |
| 2006/0218153 A1* | 9/2006 | Voon et al. ...................... 707/10 |
| 2006/0265427 A1 | 11/2006 | Cohen et al. |
| 2006/0265477 A1 | 11/2006 | Bartholomew |
| 2006/0272031 A1* | 11/2006 | Ache et al. ...................... 726/28 |
| 2007/0061245 A1 | 3/2007 | Ramer et al. |
| 2007/0073596 A1 | 3/2007 | Alexander et al. |
| 2007/0083471 A1 | 4/2007 | Robbin et al. |
| 2007/0106551 A1 | 5/2007 | McGucken |
| 2007/0156594 A1 | 7/2007 | McGucken |
| 2007/0168485 A1 | 7/2007 | DuFour |
| 2007/0171374 A1* | 7/2007 | Moore et al. ..................... 352/40 |
| 2007/0174385 A1 | 7/2007 | DuFour |
| 2007/0177616 A1 | 8/2007 | Jabri et al. |
| 2007/0180485 A1* | 8/2007 | Dua ............................. 725/114 |
| 2007/0214180 A1 | 9/2007 | Crawford |
| 2007/0255965 A1 | 11/2007 | McGucken |
| 2007/0266028 A1 | 11/2007 | Muller et al. |
| 2007/0266047 A1 | 11/2007 | Cortes et al. |
| 2008/0005654 A1 | 1/2008 | Devericks |
| 2008/0010139 A1 | 1/2008 | Elmer et al. |
| 2008/0016577 A1 | 1/2008 | Goldfarb et al. |
| 2008/0022135 A1 | 1/2008 | Gaya |
| 2008/0070588 A1 | 3/2008 | Morin |
| 2008/0086368 A1 | 4/2008 | Bauman et al. |
| 2008/0103977 A1 | 5/2008 | Khosravy et al. |
| 2008/0109911 A1 | 5/2008 | Tedesco et al. |
| 2008/0148363 A1 | 6/2008 | Gilder et al. |
| 2008/0214166 A1 | 9/2008 | Ramer et al. |
| 2008/0248809 A1 | 10/2008 | Gower |
| 2008/0248815 A1 | 10/2008 | Busch |
| 2008/0263056 A1* | 10/2008 | Murray et al. .................. 707/10 |
| 2008/0263602 A1* | 10/2008 | Murray et al. .................. 725/87 |
| 2008/0263603 A1* | 10/2008 | Murray et al. .................. 725/87 |
| 2008/0263604 A1* | 10/2008 | Murray et al. .................. 725/87 |
| 2008/0263610 A1* | 10/2008 | Murray et al. ................ 725/110 |
| 2009/0037963 A1* | 2/2009 | Murray et al. .................. 725/92 |
| 2009/0037964 A1* | 2/2009 | Murray et al. .................. 725/92 |
| 2009/0228567 A1 | 9/2009 | Maurer |
| 2009/0228574 A1 | 9/2009 | Maurer |
| 2009/0228985 A1 | 9/2009 | Maurer |
| 2012/0197698 A1* | 8/2012 | Kokernak et al. ............ 705/14.4 |
| 2013/0312017 A1* | 11/2013 | Rao .................................. 725/5 |

OTHER PUBLICATIONS

"Website." Princeton WordNet Search—3.0. WordNet home page. http://wordnetweb.princeton.edu/perl/webwn?s=website&sub=Search+WordNet&o2-&oO=1&o7=&o5=&o1=1&o6=&o4=&o3=&h=. Mar. 4, 2011. One page.
Office Action mailed Jul. 21, 2014. U.S. Appl. No. 12/075,224.
Response to Office Action mailed Jul. 21, 2014. U.S. Appl. No. 12/075,224, filed Sep. 18, 2014.
Office Action mailed Dec. 12, 2014. U.S. Appl. No. 12/075,224.
Office Action mailed Mar. 26, 2014. U.S. Appl. No. 12/075,201.
Response to Office Action mailed Mar. 26, 2014. U.S. Appl. No. 12/075,201, filed Jul. 28, 2014.
Office Action mailed Oct. 7, 2014. U.S. Appl. No. 12/075,201.
Response to Office Action mailed Oct. 7, 2014. U.S. Appl. No. 12/075,201, filed Nov. 10, 2014.
Advisory Action mailed Nov. 25, 2014. U.S. Appl. No. 12/075,201.

* cited by examiner

DIGITAL MEDIA CONTENT CREATION AND DISTRIBUTION METHODS

BACKGROUND OF THE INVENTION

1. Field of the Invention

The present invention relates generally to digital media content creation and distribution. Further, the present invention relates to digital media creation, upload, download, and rights acquisition by users of a network-based system and methods of using the same.

2. Description of the Prior Art

Historically, music and entertainment was provided solely in a live format, wherein the audience only had real-time, live access to the performance. If someone wanted to access the music and entertainment, one had to travel to be in person for the performance. If payment was required, it would be on a pay-per-attendance basis made at the time the performance was rendered. Still music, plays, readings and other performances were documented on paper and issues of copyright infringement or plagiarism were relevant and problematic, in particular being difficult to monitor and police. Early and distributed release of the documented music by the actual or true author was one possible solution to these problems, although far from completely addressing the issues.

Later, music companies or record labels were established to manage the release and distribution of music and other entertainment. Publishing companies were similarly situated to manage written works, including texts, art, and the like. While distribution of the music and entertainment improved, the selection and timing of release was made by the third party companies, rather than by the artist or the consumer. So many talented artists and authors created works that were still nearly impossible to distribute or promote, in particular beyond time and geographic constraints. Recording and producing the music and entertainment, including digital mastering, was essentially controlled and managed by a few companies, rather than the artists and authors. Artists are paid very small fees, usually less than 10% of revenue from sales. Most of the ownership rights or copyrights were required to be assigned to the companies rather than being retained by the authors in exchange for the selective distribution, which frequently resulted in artistic compromise or censorship.

Compensation is required for the creating and distributing parties within the entertainment equation, otherwise, new content of quality will not be regularly created. While some Internet websites like iTunes at apple website provide for on-demand download to users having accounts who pay for rights to download copies, these sites do not provide for the user to play or download to a multiplicity of devices, with the exception of backup copies. Users can selectively access content they want, buying on a per-song or per-album basis, and similarly on a per-book or per-movie basis. While this scenario and business model improves distribution and helps to avoid some of the illegal downloading by making access to content affordable, the costs are still expensive and comparable to traditional recording industry standards for purchasing a copy of the content on a CD or DVD format (where you buy the DVD or CD with a copy of the content, but you don't actually own the content, for example if the DVD or CD is damaged or stolen, you don't get a free replacement for the copy you already purchased). iTunes provides for a user to download music, movies, audio books, and the like into a library that must be stored on the user's computer. iTunes does not retain the library for each user on its site; thus, if anything is lost or damaged or the computer is stolen, the library and the valuable content on it are no longer accessible by the user who rightfully owns that content, based on the licenses purchased.

Another website with content available through the Internet is youTube at youtube website; it provides free content for play by any user on the site, and that free content is uploaded without review or confirmation of authorship or rights ownership, much less screened for quality or interest by users.

In both of the aforementioned cases, users can provide feedback or rating of the content. And the content may be categorized by subject or genre or artist. To some limited extent, it may also be searched through the website.

The Internet and web-based media distribution, along with the improvement of electronic devices for creating digital representations of works, has changed the entertainment scene; however, the industry—especially music, movies, and broadcast media (perhaps with the exception of XM radio)—has not significantly changed the business model for providing digital entertainment content to authorized users. The traditional industry position has held that its position is based on the protection of copyrights and other intellectual property; in fact, copyright infringement and illegal downloading have been problematic for a long, long time. The Internet alone has not addressed the problem of providing diverse, on-demand content to authorized users at reasonable rates, while providing reasonable compensation to artists and authors for participating in a structured, managed format. Thus there remains a need for a system and methods that provide for digital content creation and upload through a managed website for providing network-based access to authorized users who pay for predetermined rights that allow for use of the content by the authorized user on a multiplicity of devices, without having to repurchase access to the same content.

SUMMARY OF THE INVENTION

A first aspect of the present invention is to provide a method for providing digital media for distribution to users over a network including the steps of providing a digital representation of media (DRM) available for distribution over a network, wherein the DRM is provided in a digitally recorded format (DRF) and transmittable remotely to a network portal for upload to a website; and providing the DRM in DRM unit(s) stored remotely at a data storage site(s) available for selective download by authorized users of the network who access website (through the network portal) remotely and who are associated with an active account through the website; wherein the DRF is provided by a creator of the DRF; and wherein the DRM downloads are provided to authorized users based upon a predetermined number of simultaneous playback units of each DRM unit.

A second aspect of the present invention is to provide the DRF is input directly by the creator, artist, agent, or owner for distribution through the website as a DRM unit to authorized users, wherein the DRM units are based upon actual use at a given time, or simultaneous plays of any DRM unit authorized for use by that user.

Thus, the present invention provides completely remote access to DRM that is maintained by someone other than the authorized user, wherein the user has access to download and play the DRM units based upon actual simultaneous play of any DRM unit, regardless of the format or type of device on which the DRM units are played or accessed by the user.

These and other aspects of the present invention will become apparent to those skilled in the art after a reading of the following description of the preferred embodiment when considered with the drawings, as they support the claimed invention.

DETAILED DESCRIPTION

Figure 1:
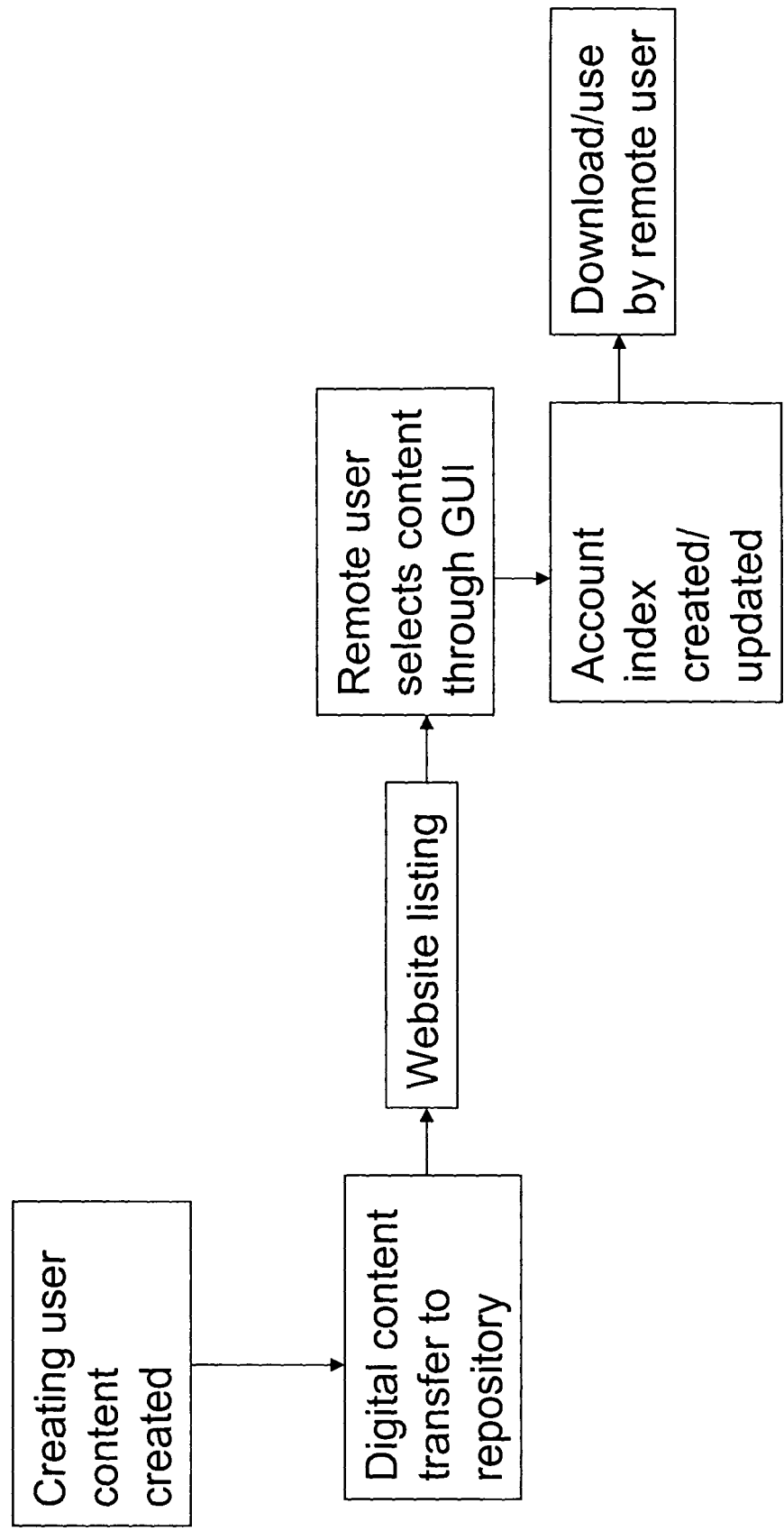
FIG. 1 is a flow diagram of the method according to one embodiment of the present invention.

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

The present invention provides a system and methods that provide for digital content creation and upload through a managed website for providing network-based access to authorized users who pay for predetermined rights that allow for use of the content by the authorized user on a multiplicity of devices, without having to repurchase access to the same content to address the longstanding, unmet needs within the entertainment industry to address interests of consumers, artists and authors, and the entity managing and securing authorized, legal rights to distribute and sell access to that digital content, on demand by authorized users.

Figure 2:
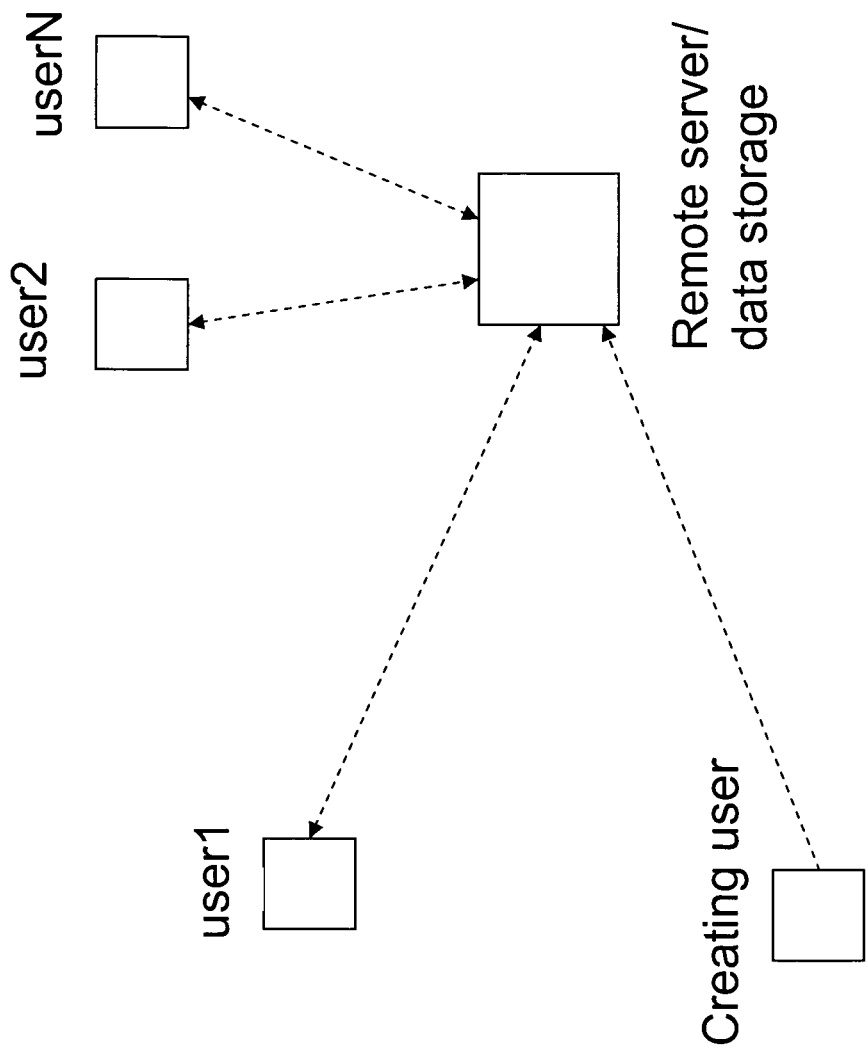
FIG. 2 is a schematic diagram of the system supporting the methods of use, in accordance with an embodiment of the present invention.

Referring now to the drawings in general, the illustrations are for the purpose of describing a preferred embodiment of the invention and are not intended to limit the invention thereto. As best seen in FIG. 1, a flow diagram is provided for user access to the system, which is shown in the schematic representation of FIG. 2. FIG. 1 illustrates steps for a creating user to create content, transfer the digital version of the content to a data input or repository for storage, indexing, and access, the website generating a listing or index associated with that content, including categorization, a user selecting content and an automatic generation of an account content index, and then the user using the content, such as via download of a digital copy of the content. FIG. 2 illustrates user1, user2, . . . userN interacting with a remote server or data repository through network interaction; also, a creating user accessing the remote server or data repository for uploading digital content is illustrated.

The present invention provides a method for providing digital media for distribution to users over a network including the steps of providing a digital representation of media (DRM) available for distribution over a network, wherein the DRM is provided in a digitally recorded format (DRF) and transmittable remotely to a network portal for upload to a website; and providing the DRM in DRM unit(s) stored remotely at a data storage site(s) and available for selective download by authorized users of the network who access website (through the network portal) remotely and who are associated with an active account through the website; wherein the DRF is provided by a creator of the DRF; and wherein the DRM downloads are provided to authorized users based upon a predetermined number of simultaneous playback units of each DRM unit. Preferably, the DRM downloads are repeatedly downloadable based upon a predetermined number of downloads per DRM unit, which is associated with each authorized user, not based upon the number of devices to which the DRM is downloaded. Importantly, in sharp contrast to prior art, the DRM download does not affect the DRM availability to the authorized user, because according to the present invention, the DRM remains with the website, and is actually not transferred to the user. A digital copy is downloaded by the user onto any device owned or operated by the user, in exchange for a license to use or play the DRM in accordance with the license rights granted.

Significantly, with the methods and system of the present invention, the user has completely remote access to DRM that is maintained by someone other than the authorized user, and furthermore, the user has access to download and play the DRM units based upon actual simultaneous play of any DRM unit, regardless of the format or type of device on which the DRM units are played or accessed by the user. So then if the user is traveling anywhere on the globe but accessing the network from a multiplicity of access devices, including but not limited to mobile phones, computers, PDAs, MP3 players, audio and/or visual players, DVRs, and the like, and combinations thereof, then the user still has access to any DRM units within that user's authorized portfolio (or collection, family, group, database, depository, repository) of DRM units, which are available for selective download and play, or direct experience (including audio and/or video) through the website portal, accessed by the authorized user through a network such as the world wide web or Internet.

The user creates their own portfolio of content in DRM, including but not limited to music, movies, audio books, podcasts, radio, news, broadcasts (stored), and the like, and combinations thereof. The portfolio index of that content is stored for each user, while the content distributor or provider stores only one digital copy of each DRM, thereby creating a singular or primary library that is remotely stored from any user or user's device(s). The portfolio index indicates which of the primary library the user has rights to access simultaneously, regardless of the device on which the user wants to access or download the content. Users can therefore access the content from any device, at any time, any place that is network accessible. The predetermined number of DRM units accessible by a single authorized user for simultaneous use is established to be between one (1) and N, where N is provided to ensure flexibility of enjoyment and use by an authorized user, but N is less than unlimited in order to ensure that the system and methods of the present invention are used, and therefore to prevent counterfeiting, illegal access or downloading, which ensures appropriate compensation to the authors, artists, and distribution entity.

Regarding the business model and therefore methods of doing business for digital media content creation and distribution according to the present invention, the authorized users pay a fee for access to the content, regardless of the number of access times or devices with which the content is accessed, specifically paying for each DRM unit. The DRM units selected by the authorized user is documented in that authorized user's portfolio index, which references which portions of the primary library that authorized user has rights to access. In one embodiment, for each paid content unit, or DRM unit, the authorized user pays a predetermined amount that is significantly less than other web-based models.

A portfolio index may be optionally shared with other authorized users, preferably for a fee. By way of example to illustrate this case, and not by way of limitation of the scope of the invention, a family of four may elect to pay for 2, 3, or 4 concurrent users of the database allowing that number of users to access any combination of works simultaneously. So a family with a three-user license may be playing song A in a car, song A in the kitchen, and movie B in the den at the same time since they have paid for three people to access the database simultaneously. Furthermore, distinctions may be identified for different types of users allowing them to be charged using differing methods. For example, a movie theater may download or access a movie to be run for a number of people to view simultaneously. The artist/owner would then be paid a fee based on the number of people viewing the movie. Distinctions could be made for other types of users including schools, radio stations, dance clubs, etc where the fee could be nothing, based on number of viewers/listeners, or based on the capacity of the venue.

Preferably, the DRF is input directly by the creator, artist, agent, owner or authorized creative entity (hereinafter "creating user") for distribution through the website. In one embodiment, the DRF is created by the creator or creating user at a media station having direct connectivity for upload to the website. In another embodiment, the creating user has a pre-digitally recorded copy of the content ready-to-distribute. The creating user, in any case, makes a certification that they are the true author or owner of the content they intend to provide for digital upload and distribution through the site. Additionally, the creating user has the sole decision as to what content is uploaded; it is not censored or limited, at least initially.

Optionally, there is a review panel that provides for screening of content for rating and/or quality purposes. The review panel may include authorized users, and preferably active users who can provide a democratic voice or at least a representative cross-section of the users to indicate what position the user base may be. This may be further subdivided by geography, religion, language, etc.

Certain modifications and improvements will occur to those skilled in the art upon a reading of the foregoing description. By way of example, technological advancements in media may include a form other than "digital" media; a variety of methods may be created to "download" or "access" media; numerous hand held, microchip, contact lens, ear piece, or implanted devices may be utilized to view and hear media or send the information directly to the brain; other methods of sharing a database or indexing that database could be utilized, etc. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the following claims.

What is claimed is:

1. A computer-implemented method for providing digital media for distribution to authorized users over a network comprising:

receiving, at a server and through a network portal, a digital media file from a rights holder other than the authorized users, the server configured to electronically transmit the digital media file to the authorized users over a network based on respective accounts of the authorized users;

determining for an account of a given authorized user and based on a received fee, a maximum number of simultaneous accesses that are permitted for electronic devices that are remote from the server to access the digital media file through the account, the maximum number of simultaneous accesses being the number of times that the digital media file can be accessed through the account by multiple devices at the same time;

associating multiple different users with the account that are each able to access the digital media file, the multiple different users being in addition to the authorized user of the account;

providing an unlimited number of non-simultaneous accesses to the digital media file;

determining that multiple devices are attempting to simultaneously access the digital media file through the account over the network;

providing simultaneous access to the digital media file to the multiple devices over the network when the current quantity of simultaneous accesses is less than the maximum number in response to determining that the multiple devices are attempting to simultaneously access the digital media file through the account; and preventing simultaneous access to the digital media file to the multiple devices when the current quantity of simultaneous accesses is greater than or equal to the maximum number in response to determining that the multiple devices are attempting to simultaneously access the digital media file through the account.

2. The method of claim 1, further comprising receiving a fee prior to establishing the account.

3. The method of claim 1, further comprising receiving the digital media file from the rights holder through a network portal.

* * * * *